March 25, 1958 R. D. CLEMSON 2,827,752
ROTARY REEL WITH CONCAVE CUTTING BLADES
Filed Feb. 15, 1955

INVENTOR
RICHARD D. CLEMSON
BY
Curtis, Morris & Safford
ATTORNEYS

United States Patent Office 2,827,752
Patented Mar. 25, 1958

2,827,752

ROTARY REEL WITH CONCAVE CUTTING BLADES

Richard D. Clemson, Middletown, N. Y., assignor to Clemson Bros., Inc., Middletown, N. Y.

Application February 15, 1955, Serial No. 488,245

6 Claims. (Cl. 56—294)

This invention relates to shearing devices and more particularly to rotary shears of the type commonly used in lawn mowers, and to cutter reels and blades therefor.

The following description and the accompanying drawings, wherein is set forth a preferred embodiment of my invention, are intended for purposes of explanation, illustration and instruction in order that others skilled in the art may fully understand the invention and be enabled to modify and adapt it to best meet the requirements of various uses; the claims will more particularly define and distinguish the invention.

Figure 1:
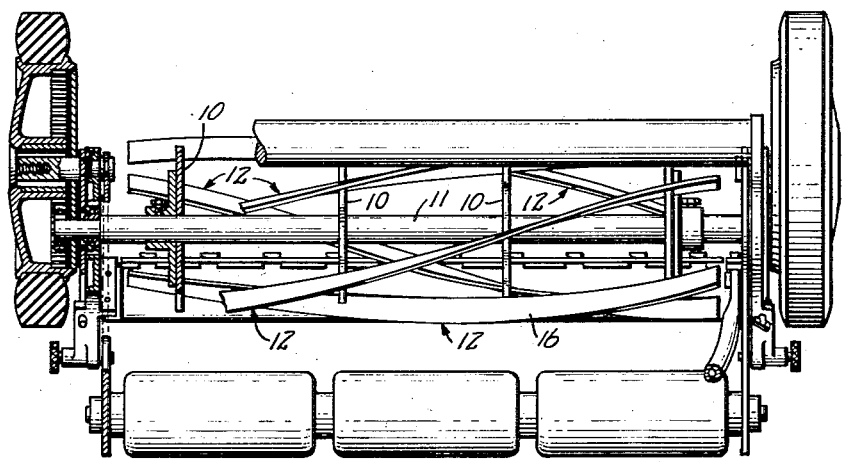
Figure 1 is a plan view partly in section of a lawn mower reel having a plurality of fly knives of a form and disposition according with the purposes of the present invention and their relation to the bed knife of the machine.
Figure 2:
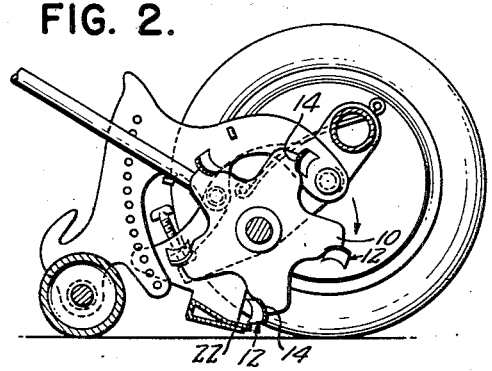
Figure 2 is a vertical section through the reel of Figure 1 showing one of the reel spiders in side view and showing the blades in cross section.
Figure 3:
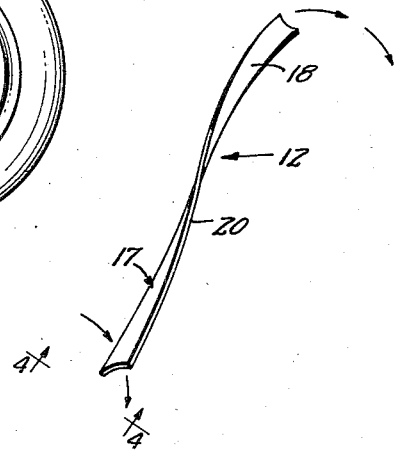
Figure 3 is a perspective view of a single blade.

In lawn mowers heretofore commonly used, a rotary cutter reel comprised of a plurality of spiral fly knives mounted upon spiders attached to a reel axle has been mounted in bearings on side frame members between ground wheels from which the reel axle is operatively driven. A bed knife is mounted on the side frames in such a manner that its cutting edge makes shearing contact successively with the fly knives. The cutting edges of the fly knives lie in a common geometric cylinder, which is also the cylinder of revolution generated by rotation of the reel. The shear edge of the bed knife also lies in the same geometric cylinder.

Upon rotating the reel, therefore, the spiral fly knives contact, progressively along their lengths, with the straight edge of the bed knife, thus forming a shear, acting progressively from one end to the other of the bed knife.

For many years lawn mowers were made with their rotating blades—generally known as "fly knives"— forged with a twist such that when mounted in the reel, the shear angle of the fly knives with the bed knife or "ledger blade" remained more or less constant at successive points along the fly knives. In cross section, such blades were ordinarily formed with a relatively thin cutting edge and a much thicker back. In my Patent No. 2,660,018, I have disclosed a blade which was of uniform thickness but angular in cross section so as to provide a thin cutting edge as before, supported by the greater rigidity of the angle section. In my said patent, I have also disclosed a turbine-like reel with blades forged to a crescent-like cross section. In one embodiment there disclosed, the chord across the concave side of the blade was directed behind the axis of the reel so that the blade would have a turbine effect to suck air into the reel and thus tend to lift the grass upright across the bed knife to assure efficient cutting and also to give the blade a rake angle with respect to the bed knife so that the grinding effected by grit and dust engaged between the blade and the bed knife would grind the blade to a knife edge, thus giving a sickle action as well as a shear.

I have now found that instead of forged blades a superior result is attained by using cold rolled steel strips cut to proper length. Each strip is shaped with transverse arcuate form, a longitudinal twist and a cylindrical spiral edge, the twist being such that the chord touching both of the edges of the concave face and normal to these edges at each point along the twisted strip length makes an acute angle with the radius of the cylinder of rotation of the reel. For example, the blades may advantageously be formed of tough steel strip 1 inch wide and $\frac{3}{32}$ of an inch thick, given a transverse circular arcuate form so that the convex surface of the blade has a radius of $\frac{3}{4}$ inch. With a shaped blade of this size in position in the reel, prior to grinding, giving cylinder of revolution of diameter 5 and $\frac{13}{16}$ inches, this chord angle is advantageously established at an acute angle of 8° on the side of the reel axis toward which the fly knife moves in its shearing action, i. e., the initial lead angle $\alpha$ of the chord is 8°. Initially, the tangent to the front, i. e., concave, face of the blade at the outer edge, before grinding, is established at 28° on the side of the reel axis away from that in which the fly knife moves in its shearing action, i. e., the initial rake angle $\beta$ is 28°.

During the initial grinding of the blades in manufacturing the finished reel, the cylinder of revolution is advantageously reduced to 5 and $\frac{5}{8}$ inches, bringing the lead angle $\alpha$ of the chord up to 13° and reducing the rake angle $\beta$ of the tangent to the front cutting face adjacent the cutting edge to 23°.

To obtain these relationships in a reel having a cylinder of revolution as specified above, the center for the $\frac{3}{4}$ inch radius of curvature of the convex face of the blade may be located at a point X having a radius of $2\frac{5}{8}$ inches from the axis of rotation of the reel.

As the blades are resharpened from time to time after use, the lead angle $\alpha$ of the chord increases and the rake angle $\beta$ of the tangent decreases.

I have further found surprisingly efficient cutting over a long period of service is maintained with a chord lead angle $\alpha$ in the range from 8° to 20°; and with a rake angle $\beta$ in the range from 28° to 10°.

I have now found that in addition to advantages attained by the fly knives set forth in my earlier patents and applications, the blades can be less subject to malfunctioning due to battering the shear edge against stones, nails, etc., if the blades are shaped so that the chordal line across the edges is directed forward of the axis of the reel, e. g., a distance of about $\frac{5}{8}''$ with the particular curvature shown. With the form and arrangement of the fly knives as heretofore used, when the blade has struck a stone, etc., causing a permanent bulge in the cutting edge of the blade, it has caused the metal of the blade to project beyond the cylinder of revolution of the reel and thus caused noisy and inefficient operation due to clashing of such projecting metal against the bed knife with each revolution of the reel.

According to my present invention forms of the fly knives and reel spiders are changed so that the chord line of the fly knife is directed forward of the reel axis, thus the fly knife can be substantially deformed without substantially projecting beyond its cylinder of revolution. The tendency to deform the blade so that its edge is driven back is counteracted by the transverse curvature of the blade which when flattened tends to move its edge outward. In this case, due to the orientation of the arc, the yield of the blade to impact tends to move the edge along the cylinder of revolution without substantial departure from it. As shown, the cutting edge of the blade has a very slight rake angle.

If the angle of the blade chord line with the radius of its cylinder of revolution is expanded too far ahead of the axis, that is, ahead of the range of the lead angle α shown, a bend, when it occurs as a result of impact, would reduce the radius to the cutting edge at the bend so that there would be a spot in which the blade could not give fully efficient shear engagement with the bed knife. If, on the other hand the angle of the chord is too far back, deformation of the fly knife by impact would cause clashing as above described. The chord angle α of the fly knife according to my invention is selected substantially between these two positions. In the present position any deflection which occurs produces practically little change in the radius of the shearing edge of the blade, or very little change in the rake angle of the cutting edge itself.

It is an advantage of this concave blade that any accidental deformation of the cutting edge causes only slight reduction of the rake angle of the cutting face and thus does not impair the shearing action, as so often occurs with flat blades when the cutting edge is deformed, the edge being displaced rearwardly and rolled over.

Figure 4:
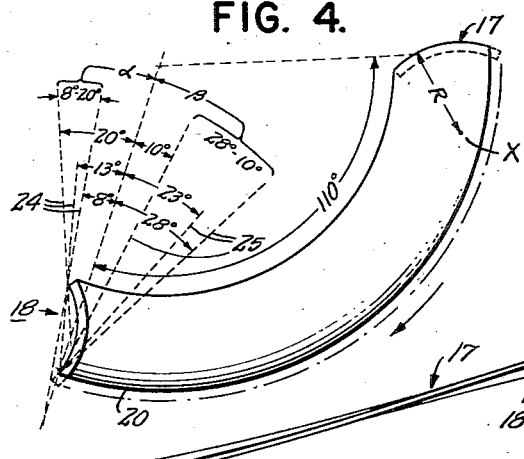
Figure 4 is an end view in elevation shown on enlarged scale of a single blade looking in a direction parallel to the axis of the cylindrical spiral to which the blade is formed.
Figure 5:
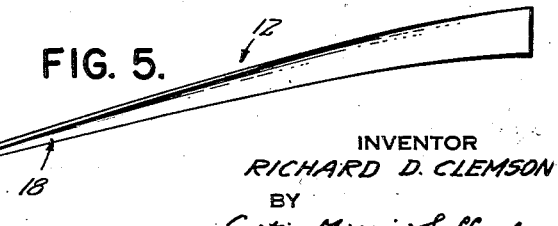
Figure 5 is a plan view of a single blade.

Referring to the drawings the reel spiders, indicated by the numeral 10, are secured on shaft 11. The individual fly knives, here five in number, are indicated by the numeral 12. Each spider is provided with a plurality of accurately formed seats 14 each adapted to provide support for a portion 16 of the convex side 17 of a fly knife 12 and position it as above set forth. The concave side of the fly knife is indicated at 18. The shearing edges 20 of the blades ground to the cylinder coaxial with shaft 11, cooperate with the bed knife 22 to form a shear. It will be seen that the extended chord 24 of the fly knife is appreciably in advance of the center of the cylinder of revolution, or to the left of the center of the spider as seen in Figure 4, whereas the tangent 25 to the cross sectional curve at the cutting edge is shown extending on the opposite side of the center.

It will be seen from the above that even with the concave fly knife as shown in my Patent No. 2,660,018, when a stone interfered between the shearing edges of bed and fly knife respectively, the acutely ground edge of the fly knife could be dented, extrudingly metal down beyond the cylinder of revolution, or be bent back and down (due its curvature); whereas the ground edge of the fly knife in the present invention, because of the forwardly slanted position of the chord as shown, produces a much more obtuse angle more resistant to denting, and if bent back will still remain substantially in the cylinder of revolution. For this reason the efficient functioning of the mower is far less likely to be impaired.

When an obstruction hits the fly knife near its point of support on the spider, the effect is limited to flattening its curvature, but if it is between spiders there is also a tendency to bend the fly knife longitudinally. In general, it has been found that, with the relations shown, there will be little retraction or projection of the fly knife from the cylinder of revolution by such bending whether between spiders or immediately adjacent a spider.

I claim:

1. A blade for lawn mowers and the like which comprises a strip transversely curved forming a concave face and a convex face for said blade, curved longitudinally with its outer edge following a cylindrical spiral, and twisted longitudinally, the inner edge of said blade curving farther ahead of said concave face than its outer edge with the result that a line touching both the outer and inner edges of the concave face and which is normal to the edges at the point of contact passes ahead of the radius of the spiral to the outer edge at said point, said line making a lead angle with said radius lying within the range of 8° to 20° and with the result that a line which is tangent to the concave side adjacent the outer edge makes a rake angle lying within the range of 10° to 28°.

2. A rotary shear lawn mower which comprises a bed knife a reel having a plurality of concave-convex blades and means for rigidly mounting said blades with their shear edges in co-operable relation to the bed knife, with the concave sides of the blades facing in the direction of reel rotation, the inner edges of each blade curving farther ahead of its concave side than its shear edge so that a chord line touching both said shear edge and said inner edge makes a lead angle α with respect to a radius of revolution of the shear edge drawn to the shear edge at the same point as said chord line and so that a line tangent to said concave face at said point makes a rake angle β with respect to said radius, whereby any bending of the shear edge by impact against a stationary object will tend to move the edge back in the cylinder of revolution defined by revolution of the shear edges of the reel.

3. A rotary shear lawn mower as claimed in claim 2 and wherein said shear edge when moved back under impact maintains a substantial portion of said rake angle β.

4. A blade for lawn mowers and the like which comprises a cold rolled steel strip with its grain longitudinal and being transversely curved, curved longitudinally with its outer edge following a cylindrical spiral, and twisted longitudinally, the concave side being considered its fore side, the inner edge of the blade curving forward to a position ahead of the outer edge of the blade so that the chord of its cross sectional curve when extended passes forward of the axis of the spiral.

5. A blade for lown mowers and the like which comprises a strip transversely curved, curved longitudinally with its outer edge following a cylindrical spiral, and twisted longitudinally, the concave side being considered the fore side, the inner edge of the blade extending ahead of the outer edge of the blade so that the chord of its cross sectional curve when extended passes forward of the axis of the spiral and the tangent to said cross sectional curve at the outermost edge adjacent the circumscribed cylinder of said spiral makes a rake angle less than 28° with the radius of the cylinder to the point of tangency.

6. A blade for lawn mowers and the like which comprises a strip transversely arcuately curved, curved longitudinally with its outer edge following a cylindrical spiral, and twisted longitudinally, the concave side being considered the fore side, the inner edge of the blade curving forward of the outer edge to an extent such that the chord of its cross sectional curve makes a lead angle α with respect to the circumscribed cylinder of said spiral, said angle α lying within the range of 8° to 20°, and the tangent to said cross sectional curve at the outermost edge adjacent the circumscribed cylinder of said spiral makes a rake angle β with the radius of the cylinder to the point of tangency, said angle β lying within the range of 10° to 28°, and the center of curvature of the concave face is spaced from the axis of the cylinder by a distance between the lengths of the radii from the axis of the circumscribed cylinder to the outer and inner edges of the blade.

References Cited in the file of this patent

UNITED STATES PATENTS

| 364,792 | Beecher | June 14, 1887 |
|---|---|---|
| 597,972 | Graham | Jan. 25, 1898 |
| 1,882,195 | Sharp | Oct. 11, 1932 |

FOREIGN PATENTS

| 3,175 | Austrailia | July 22, 1931 |